Patented Sept. 9, 1941

2,255,407

UNITED STATES PATENT OFFICE 2,255,407

QUINRHODINE QUATERNARY SALTS AND DYES THEREFROM

Leslie G. S. Brooker, Rochester, N. Y., assignor to Eastman Kodak Company, Rochester, N. Y., a corporation of New Jersey No Drawing. Application February 21, 1940, Serial No. 320,163. In Great Britain March 30, 1939

9 Claims. (Cl. 260—286)

This invention relates to new quaternary salts and to dyes therefrom.

A group of compounds known as quinrhodines have been described by Granächer, Ofner and Klopfenstein in Helv. Chim. Acta, vol. 8, page 883 (1925). I have now found that these compounds which can be formulated as follows:

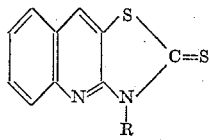

wherein R represents an alkyl group, can be reacted with alkyl salts to give quaternary salts which can be formulated as follows:

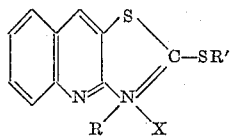

wherein R and R' each represent an alkyl group and X represents an acid radical.

I have further found that these new quaternary salts can be reacted with cyclammonium quaternary salts containing a methyl group in the α- or γ-position, i. e. in one of the so-called reactive positions, to give new monomethine cyanine dyes. I have also found that these new quaternary salts can be reacted with heterocyclic organic compounds containing a reactive methylene group adjacent to a carbonyl group, to give simple merocyanine dyes. I have also found that these new quaternary salts can be reacted with malonic acid to give new monomethine cyanine dyes. The new cyanine and merocyanine dyes obtainable according to my invention sensitize photographic silver halide emulsions.

It is accordingly an object of my invention to provide new quaternary salts and new dyes. A further object is to provide a process for preparing such new quaternary salts and such new dyes. Other objects will appear hereinafter.

In accordance with my invention, I prepare my new quaternary salts by reacting an alkyl salt with a quinrhodine which, according to accepted systems of nomenclature, may also be called a 3-alkyl-2(3)-thiothiazolo [4,5-b] quinolinone. As alkyl salts, alkyl-p-toluenesulfonates are advantageously employed, although alkyl halides and dialkyl sulfates are likewise suitable. Heat accelerates the reaction. The following example will serve to demonstrate the manner of obtaining the quaternary salts.

EXAMPLE 1.—*2-methylmercapto-thiazolo [4,5-b] quinoline-3-etho-p-toluenesulfonate*

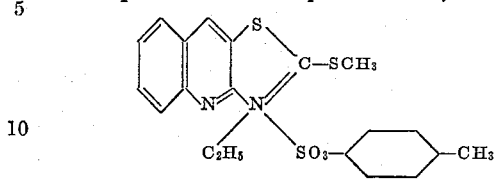

16.4 g. (1 mol.) of 3-ethyl-2(3)-thio-thiazolo [4,5-b] quinolinone and 24.8 g. (2 mol.) of methyl-p-toluenesulfonate were heated together in an oil bath, using an air condenser, at 150° C. for 2½ hours. The cooled reaction mixture was washed with diethyl ether, then triturated with acetone, the acetone mixture cooled, filtered and the resulting quaternary salt dried in the air. 20 g. (73% yield) of the salt was thus obtained. It was recrystallized from ethylene chloride (25 cc. per gram of salt) and obtained as white crystals melting at 182° to 185° C. with decomposition.

Such quaternary salts are advantageously condensed with cyclammonium quaternary salts containing a methyl group in the α- or γ-position, in the presence of a basic condensing agent. As basic condensing agents, strong tertiary organic bases, such as triethylamine or triethanolamine, (i. e. bases having a dissociation constant substantially greater than that of pyridine), are advantageously employed. The condensations are advantageously effected in an alcoholic medium, ethyl alcohol, isopropyl alcohol and n-propyl alcohol being suitable. Heat accelerates the condensations. The following example will serve to illustrate such a condensation.

EXAMPLE 2.—*[3-ethyl-2-benzothiazole]-[3-ethyl-2-thiazolo-(4,5-b)-quinoline]-methine-cyanine iodide*

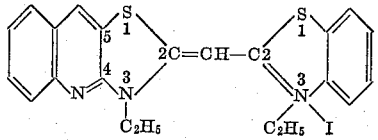

0.25 g. (1 mol.) of 3-ethyl-2(3)-thio-thiazolo [4,5-b] quinolinone and 0.15 g. (1 mol.) of diethyl sulfate were mixed together. The mixture was heated in an oil bath at 180° C. for 10 minutes. The cooled product was dissolved in 15 cc. of absolute ethyl alcohol. To this solution were added 0.3 g. (1 mol.) of 2-methylbenzothiazole ethiodide and 0.1 g. (1 mol.) of triethylamine. The resulting mixture was allowed to stand for one hour. A yellow dye separated out. It was filtered off and twice recrystallized from pyridine (1000 cc. per gram of dye). In this manner, 0.05 g. (10% yield) of minute yellow crystals, melting at 275° to 278° C. with decomposition, were obtained. The dye sensitized a gelatino-silver-chloride emulsion strongly out to 525 mu. with a flat maximum at about 470 mu.

In the foregoing example, 2-methylbenzoselenazole, μ-methylnaphthothiazole, 2-methylbenzoxazole or μ-methylnaphthoxazole quaternary salts can be employed instead of 2-methylbenzothiazole ethiodide.

My new quaternary salts are advantageously condensed with heterocyclic organic compounds containing a reactive methylene group adjacent to a carbonyl group, in the presence of a basic condensing agent. As basic condensing agents, strong tertiary organic bases, such as triethylamine, are advantageously employed. The condensations are advantageously effected in an alcoholic medium. Heat accelerates the condensations. The following example will serve to illustrate such a condensation.

EXAMPLE 3.—[3-ethyl-2-thiazolo-(4,5-b)-quinoline]-[3-ethyl-5-rhodanine]-merocyanine

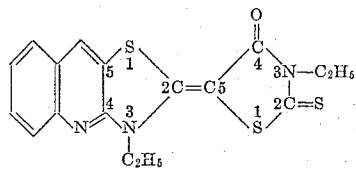

0.43 g. (1 mol.) of 2-methymercaptothiazolo [4,5-b] quinoline-3-etho-p-toluenesulfonate and 0.16 g. (1 mol.) of 3-ethylrhodanine were dissolved in 25 cc. of absolute ethyl alcohol by warming 3 to 5 minutes on the steam pot. 0.1 g. (1 mol.) of triethylamine was then added to the solution and the solution was boiled, under reflux, for 3 to 5 minutes. The dye which separated from the cooled reaction mixture was filtered off and twice recrystallized from glacial acetic acid (1500 cc. per gram of dye). 0.15 g. (41% yield) of the dye was obtained as yellow needles melting at 328 to 330° C. with decomposition. The dye sensitized a gelatino-silver-chloride emulsion moderately strongly out to 510 mu. with a flat maximum at about 470 mu.

Instead of 3-ethylrhodanine, 3-phenylrhodanine, 3-ethyl-2,4(3,5)-oxazoledione or 1,3-diphenyl-2-thiohydantoin can be employed in the above example.

The new quaternary salts are advantageously condensed with malonic acid in the presence of pyridine. The following example illustrates the condensation.

EXAMPLE 4.—bis-[3-ethyl-2-(thiazolo[4,5-b]-quinoline)]-methinecyanine-p-toluenesulfonate

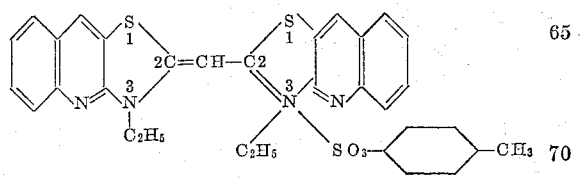

0.86 g. (2 mol.) of 2-methylmercaptothiazolo-[4,5-b] quinoline-3-etho-p-toluenesulfonate and 0.1 g. (1 mol.) of malonic acid were mixed together in 10 cc. of pyridine. The mixture was boiled, under reflux, for 3 to 5 minutes. The dye which separated from the cooled reaction mixture was filtered off. It was twice recrystallized from methyl alcohol (200 cc. per gram of dye) and obtained as small yellow crystals, melting at 298 to 300° C. with decomposition. 0.2 g. (20% yield) of the dye were obtained. The dye sensitized a gelatino-silver-chloride emulsion moderately strongly out to 525 mu. with a maximum at about 475 mu.

Our new dyes are especially useful for sensitizing the customarily employed gelatino-silver-chloride developing-out emulsions. In the preparation of photographic emulsions containing my new dyes, it is only necessary to disperse the dyes in the emulsions. The methods of incorporating dyes in emulsions are simple and well known to those skilled in the art. In practice, it is convenient to add the dyes to the emulsions in the form of a solution in an appropriate solvent. Methanol has proven satisfactory as a solvent for my new dyes. The dyes are advantageously incorporated in the washed, finished emulsions.

The concentration of my new dyes in the emulsion can vary widely, e. g. from 5 to about 100 mg. per liter of flowable emulsion. The concentration of the dye will vary according to the type of emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye, is slowly added to about 1000 cc. of a gelatino-silver-chloride emulsion, with stirring. Stirring is continued until the dye is thoroughly incorporated.

With most of my new dyes, 10 to 20 mg. of dye per liter of gelatino-silver-chloride emulsion (containing about 15 grams of silver halide) suffice to produce the maximum sensitizing effect. With extremely fine-grain emulsions, somewhat larger concentrations of dye may be needed to produce the maximum sensitizing effect.

The above statements are only illustrative, as it will be apparent that my dyes can be incorporated in photographic emulsions by any of the other methods customarily employed in the art; as by bathing a plate or film upon which an emulsion is coated, in a solution of the dye in an appropriate solvent, although such a method is not ordinarily to be preferred.

Emulsions sensitized with my new dyes can be coated on to suitable supports, such as glass, cellulose derivative film, resin film or paper, in the usual manner.

What I claim as my invention and desire to be secured by Letters Patent of the United States is:

1. A quaternary salt having the following general formula:

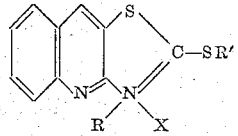

wherein R and R' each represent alkyl groups and X represents an acid radical.

2. A quaternary salt having the following general formula:

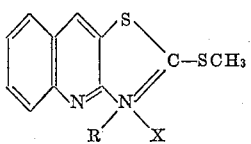

wherein R represents an alkyl group and X represents an acid radical.

3. A quaternary salt having the following general formula:

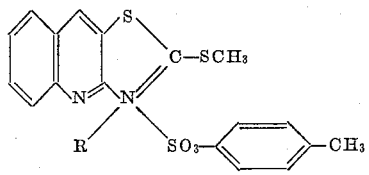

wherein R represents an alkyl group.

4. A quaternary salt having the following formula:

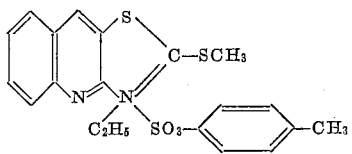

5. A quaternary salt having the following general formula:

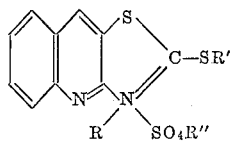

wherein R, R' and R'' represent alkyl groups.

6. A quaternary salt having the following formula:

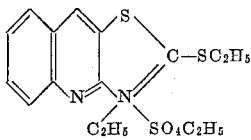

7. A process for preparing a quaternary salt comprising reacting an alkyl salt with a 3-alkyl-2(3)-thio-thiazolo [4,5-b] quinolinone.

8. A process for preparing a quaternary salt comprising reacting an alkyl-p-toluenesulfonate with a 3-alkyl-2(3)thio-thiazole [4,5-b] quinolinone.

9. A process for preparing a quaternary salt comprising reacting a dialkyl sulfate with a 3-alkyl-2(3)-thio-thiazole [4,5-b] quinolinone.

LESLIE G. S. BROOKER.